(12) United States Patent
Shen et al.

(10) Patent No.: US 12,463,791 B2
(45) Date of Patent: Nov. 4, 2025

(54) METHOD FOR DETECTING BLINDING ATTACKS ON PHOTODETECTORS IN A QUANTUM CRYPTOGRAPHY SYSTEM

(71) Applicant: NATIONAL UNIVERSITY OF SINGAPORE, Singapore (SG)

(72) Inventors: Lijiong Shen, Singapore (SG); Christian Kurtsiefer, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 139 days.

(21) Appl. No.: 18/556,249

(22) PCT Filed: Feb. 8, 2022

(86) PCT No.: PCT/SG2022/050062
§ 371 (c)(1),
(2) Date: Oct. 19, 2023

(87) PCT Pub. No.: WO2022/225448
PCT Pub. Date: Oct. 27, 2022

(65) Prior Publication Data
US 2024/0187207 A1 Jun. 6, 2024

(30) Foreign Application Priority Data

Apr. 19, 2021 (SG) .......................... 10202103968W

(51) Int. Cl.
*H04L 9/00* (2022.01)
*H04L 9/08* (2006.01)

(52) U.S. Cl.
CPC ............ *H04L 9/005* (2013.01); *H04L 9/0852* (2013.01)

(58) Field of Classification Search
CPC ....... H04L 9/005; H04L 9/0852; H04L 9/002; H04B 10/70
See application file for complete search history.

(56) References Cited

U.S. PATENT DOCUMENTS 8,126,146 B2 * 2/2012 Kim ...................... H04L 9/0858
380/278
8,320,774 B2 * 11/2012 Zbinden ................. H04B 10/70
398/187
(Continued)

FOREIGN PATENT DOCUMENTS

CN 102739395 A 10/2012
CN 204128683 U 1/2015
(Continued)

OTHER PUBLICATIONS

Extended Search Report issued in corresponding European Patent Application No. 22792107.9 on Sep. 2, 2024, consisting of 9 pp.
(Continued)

*Primary Examiner* — Hosuk Song
(74) *Attorney, Agent, or Firm* — Volpe Koenig

(57) ABSTRACT

A method of identifying occurrence of a blinding attack in a quantum cryptography system, and a receiver for a quantum cryptography. The method comprises the steps of providing a light emitter at a receiver of the quantum cryptography system, wherein at least a portion of light emitted from the light emitter is detectable by a single photon detector of the receiver; switching the light emitter off during a normal operation mode of the single photon detector; measuring a first number of detection events registered in the single photon detector in a first time period, T1, with the light emitter switched on; and identifying the occurrence of the blinding attack based on the first number of detection invents.

20 Claims, 7 Drawing Sheets

(56) References Cited

U.S. PATENT DOCUMENTS

| | | | | |
|---|---|---|---|---|
| 9,246,602 | B2* | 1/2016 | Ukita | H04B 10/70 |
| 9,588,737 | B2* | 3/2017 | Choi | G06F 7/588 |
| 9,634,835 | B2 | 4/2017 | Legre | |
| 10,009,113 | B2* | 6/2018 | Yoshida | H04B 10/70 |
| 10,129,021 | B2* | 11/2018 | Jeong | H04L 9/0852 |
| 10,601,507 | B2* | 3/2020 | Wabnig | H04L 9/0852 |
| 11,187,578 | B1* | 11/2021 | Kim | H04L 9/0852 |
| 11,362,817 | B2* | 6/2022 | Tomita | G02F 1/035 |
| 11,556,045 | B2* | 1/2023 | Schneeweiss | G02B 27/00 |
| 2004/0190725 | A1 | 9/2004 | Yuan | |
| 2016/0028542 | A1 | 1/2016 | Choi | |
| 2018/0152294 | A1 | 5/2018 | Legre | |
| 2020/0336291 | A1 | 10/2020 | Bussieres | |

FOREIGN PATENT DOCUMENTS

| | | |
|---|---|---|
| CN | 109495168 A | 3/2019 |
| CN | 110535640 A | 12/2019 |
| CN | 110784485 A | 2/2020 |
| EP | 3503457 A1 | 6/2019 |
| EP | 3716252 A1 | 9/2020 |
| JP | 2015012311 A | 1/2015 |

OTHER PUBLICATIONS

Fang-Xiang Wang et al. "Quantum hacking perceiving for quantum key distribution using temporal ghost imaging", arxiv.org, Cornell University Library, 201 Olin Library Cornell University Ithaca, NY 14853, Dec. 28, 2020, XP081895230.
Optica, 2019, 6(9), 1178-1184.
The European Physical Journal D, 2016, 70(5), 1-4.
Optics Express, 2013, 21(3), 2667-2673.
Optics Express, 2012, 20(17), 18911-18924.
Nature Photonics, 2010, 4, 686-689.
Scientific Reports, 2017, 7, 1978.
Chinese Physics B, 2015, 24(9), 090305.
EPJ Web of Conferences, 2015, 103, 10002.
Optics Express, 2010, 18(26), 27938-27954.
Scientific Reports, 2017, 7, 449.
Applied Physics Letters, 2011, 98, 231104.

* cited by examiner

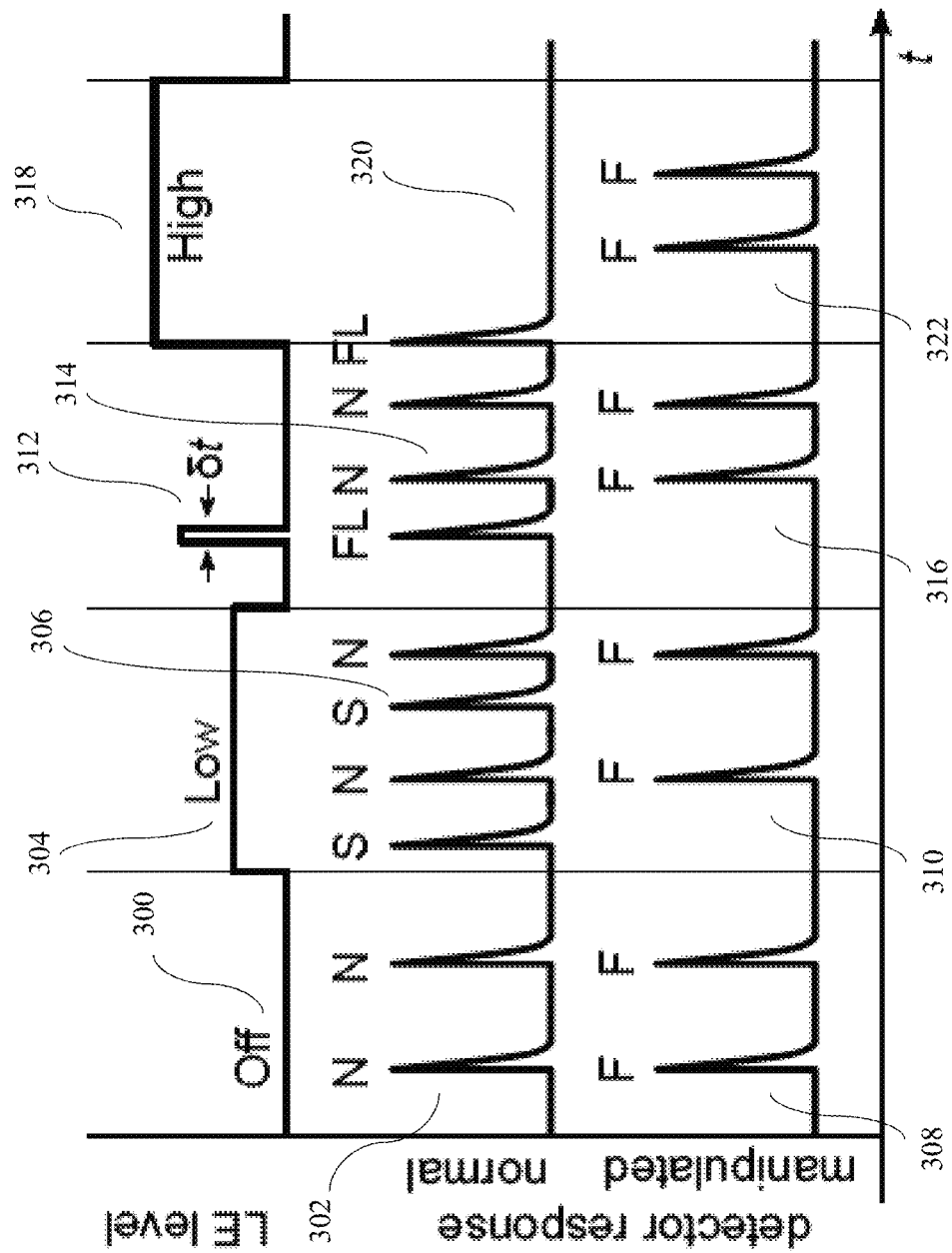

METHOD FOR DETECTING BLINDING ATTACKS ON PHOTODETECTORS IN A QUANTUM CRYPTOGRAPHY SYSTEM

FIELD OF INVENTION

The present invention relates broadly to a method of identifying occurrence of a blinding attack in a quantum cryptography system and to a receiver for a quantum cryptography system, in particular to detecting blinding attacks on photodetectors in a quantum cryptography systems by integration of a light emitter into the receiver.

BACKGROUND

Any mention and/or discussion of prior art throughout the specification should not be considered, in any way, as an admission that this prior art is well known or forms part of common general knowledge in the field.

Counter-measures against detector-blinding attacks on a quantum cryptography system such as a quantum key distribution (QKD) system based on single-photon detectors (SPDs) are desirable. Such attacks are the key vulnerability in most practical quantum key distribution systems based on single photon detection, as they allow an eavesdropper to execute a man-in-the-middle attack, performing the quantum measurements on photons instead of the legitimate receiver, and copying its measurement results into the receiver using strong light pulses. The blinding part of the attack, i.e. the manipulation of the SPDs with a tailored bright illumination to "disable" their intended single photon detection mode, typically silences the SPD, where the eavesdropper either exploits recovery mechanisms of the SPD from the blinding exposure or uses yet stronger light pulses creating "fake states" to emulate a single photon detection event on the legitimate receiver side.

One proposed counter-measure against a blinding attack involves randomly changing and constantly monitoring the detector efficiency. Additional modification of the existing single photon detectors electronic circuit is required. This could significantly affect the QKD bit rate because it may require varying the efficiency frequently to get enough statistics to identify the blinding attack.

Another proposed counter-measure uses single photon detector modules containing N detectors as a measurement unit for each of the measurement bases. Under a blinding attack, the short high-power pulse could fire the N detectors at the same time. Measuring the photo-detection events' temporal cross-correlation between the N detectors could reveal the intense pulses. However, extra single photon detectors significantly increase the overall cost of a quantum cryptography system. Moreover, where the N detectors are coupled to the different output ports of the fiber beam splitters, the eavesdropper could potentially control the splitting ratio by changing the wavelength of the bright light.

Another proposed counter-measure involves using a beam splitter to direct a fraction of light in the quantum channel to an optical power meter. If the power meter measures non-zero optical power, a blinding attack is going on. The extra optical elements in the receiver introduce additional optical loss to the quantum channel. The eavesdropper could potentially control the splitting ratio of an optical beam splitter by tuning the wavelength. This method requires an optical power meter that is sensitive to very low light levels.

In another proposed counter-measure, an attenuator is inserted inside the quantum channel and randomly vary the attenuation. The blinding attack can be detected by analyzing the detection rate at different attenuation values. This method is similar to changing the detector efficiency randomly. However, it will introduce transmission loss in the optical channel and reduce the bit rate at high attenuation values. The attenuation value is also wavelength-dependent.

Embodiments of the present invention seek to address at least one of the above problems.

SUMMARY

In accordance with a first aspect of the present invention, there is provided a method of identifying occurrence of a blinding attack in a quantum cryptography system, the method comprising the steps of:
  providing a light emitter at a receiver of the quantum cryptography system, wherein at least a portion of light emitted from the light emitter is detectable by a single photon detector of the receiver;
  switching the light emitter off during a normal operation mode of the single photon detector;
  measuring a first number of detection events registered in the single photon detector in a first time period, T1, with the light emitter switched on; and
  identifying the occurrence of the blinding attack based on the first number of detection invents.

In accordance with a second aspect of the present invention, there is provided a receiver for a quantum cryptography system, the receiver comprising:
  a single photon detector;
  a light emitter, wherein at least a portion of light emitted from the light emitter is detectable by the single photon detector;
  wherein the light emitter is configured to be off during a normal operation mode of the single photon detector; and
  a processor configured to measure a first number of detection events registered in the single photon detector in a first time period, T1, with the light emitter switched on and to identify the occurrence of the blinding attack based on the first number of detection invents.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 3A shows graphs illustrating the light emitter power level at zero, normal event detection and manipulated event detection, respectively from top to bottom, according to an example embodiment.

FIG. 3B shows graphs illustrating the light emitter power at a low level, normal event detection and manipulated event detection, respectively from top to bottom, according to an example embodiment.

FIG. 3C shows graphs illustrating the light emitter power with a short pulse at medium level, normal event detection and manipulated event detection, respectively from top to bottom, according to an example embodiment.

FIG. 3D shows graphs illustrating the light emitter power at a high level, normal event detection and manipulated event detection, respectively from top to bottom, according to an example embodiment.

DETAILED DESCRIPTION

When an SPD is under a detector-blinding attack, it is insensitive to low intensity light fields, like the ones corresponding to a photon stream used in a quantum key distribution protocol. In an example embodiment of the present invention, a light emitter is switched on under the control of the legitimate receiver which is weakly coupled to the SPDs for time windows not predictable by the eavesdropper, and observe the registered SPD events during these time windows to assess if the SPDs are under a detector-blinding attack, either by detecting additional optical events, or by detecting "fake state" events under self-blinding power levels. This measurement is repeated randomly during the QKD process to monitoring the detectors.

Figure 1:
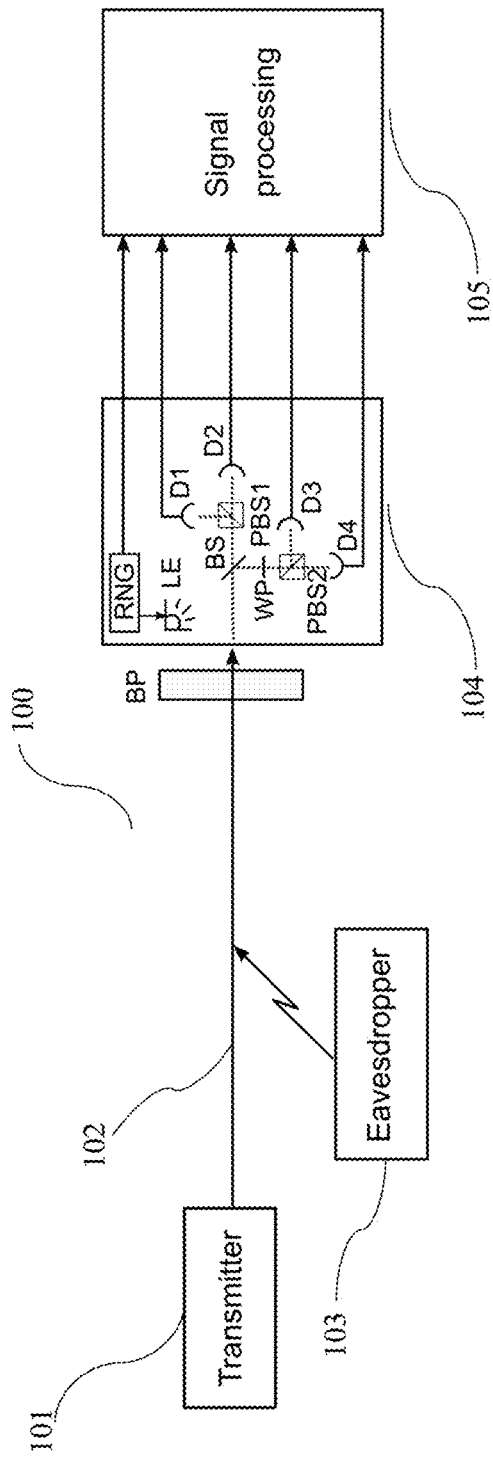
FIG. 1 shows a simplified counter measure setup layout according to an example embodiment.

Embodiments of the present invention provide a system and method to counter measure the blinding attack in a quantum cryptography system. The simplified counter measure setup layout according to an example embodiment is shown in FIG. 1, which shows a schematic of a quantum key distribution receiver (104) coupled to a signal processing unit (105) and the countermeasure according to an example embodiment against a blinding attack of a quantum cryptography system (100) with polarization encoded photons.

Typically, the quantum cryptography system 100 includes a receiver (104) containing optical elements to set measurement bases and respective single photon detectors (D1 to D4 FIG. 1) to measure the quantum information in each of the measurement bases encoded on single photons sent through a quantum channel (102) by a transmitter (101).

In the quantum cryptography system (100), the most widely used single photon detectors are avalanche photodiodes, and superconducting nanowire single-photon detectors. Both have been experimentally demonstrated to be controllable by bright light, which opens a security loophole in practical quantum cryptography systems. The vulnerability is based on the possibility of an undetected man-in-the-middle attack, whereby an eavesdropper intercepts the photon states carrying the information, carries out the quantum measurement in a basis of his/her choice, and copies the measurement result into the photon detector of the legitimate receiver. Such an attack may go undetected, as most of such photodetectors do not provide an indication if a detection event was caused by a single photon, or by something else, like a strong light pulse or a recovery event from a blinded state.

Figure 2:
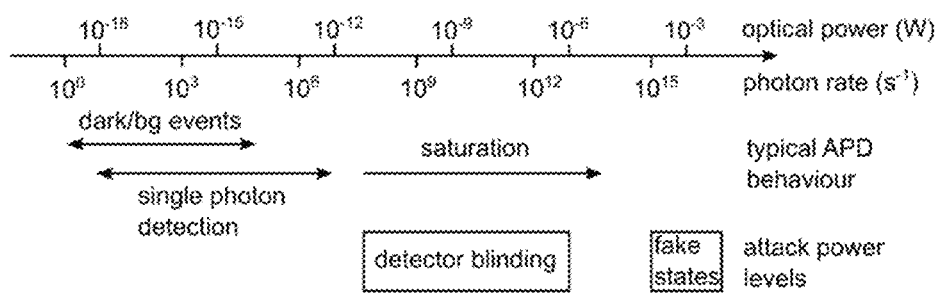
FIG. 2 shows an overview of reaction to different light levels of avalanche photodiodes for single photon detection operated in Geiger mode, where they are reversed-biased above the breakdown voltage.

For example, avalanche photodiodes for single photon detection are usually operated in Geiger mode, where they are reversed-biased above the breakdown voltage. An overview of their reaction to different light levels is shown in FIG. 2.

In its intended operation, single photon detectors create macroscopic electrical signals that allow to identify the arrival time of a single photon through generation of an avalanche discharge of the device. Typically, detection rates up to $10^6$-$10^7$ $s^{-1}$ can be achieved. The detectors themselves exhibit also dark- or background events not caused by photons on the order of $10^1$-$10^4$ $s^{-1}$. After a breakdown, the detectors need to recover to be sensitive to single photons again.

However, at power levels above a few 10 ... 100 pW, the detectors typically cannot recover anymore, and remain insensitive to single photons. In this regime, the detectors are considered "blinded". On the other hand, bright light pulses (typically of the order of several μW to mW, significantly above light levels suitable for single photon detection) can force the Geiger mode APDs to generate electrical signals that are indistinguishable from the signals caused by avalanches triggered by single photons. An eavesdropper (103) could exploit this behaviour and send additional strong optical pulses ("fake states", typically μW to mW) to fire the detectors, resulting in fake photon detection events. Alternatively, the recovering process of photodetectors after a blinding exposure has been used to create a signature resembling a single photon detection. In any case, this detector manipulation can be done in a way that allows copying a measurement result on a true quantum system (carried out by the eavesdropper) into a detector arrangement, consequently giving an eavesdropper the same information as the legitimate receiver, and thus compromising a secure key distribution process of QKD.

Example Embodiments of the Present Invention

To check if the detectors are blinded, example embodiments introduce a light emitter (LE in FIG. 1) inside the receiver (104) that is weakly coupled to the single photon detectors (D1-D4). Typically, a low-cost light emitter like LED or laser diode has output power up to several mW, while only a few nW or pW of light are necessary to either create deliberate single photon detection events caused by LE additional to those caused by the photons used for key generation or from background, or to blind the detector completely. Thus, a careful alignment of the light emitter is not required, and a weak coupling between LE and each of D1-D4 is sufficient.

Example Embodiment 1

One example embodiment to detect a blinding attack relies on the observation of deliberate events caused whenever the light emitter (LE) is switched on, as these deliberate events can be generated at times out of control of the eavesdropper. As the legitimate receiver can control the rate and timing of these deliberate events, the absence of the deliberate events while the LE is switched on is an indication that an actual blinding attack is ongoing. In a practical system, an attacker in a blinding attack scenario would need to generate background events from a separate quantum measurement process and write them into the detectors. As long as the eavesdropper has no access to the pattern of deliberate pulse creation by the legitimate receiver, an absence of the deliberate pulse pattern indicates an ongoing blinding attack.

In a simple example of a randomized excess pattern generation and blinding detection according to one example embodiment, the light emitter (LE) is switched on for a time interval T at random timing determined by a random number generator (RNG in FIG. 1). With reference now to FIG. 3A, in an unblinded scenario, with LE switched off (compare LE level graph 300 in FIG. 3A), each detector will detect single photons from a legitimate source, or background events (labelled "N" in graph 302 FIG. 3A). The average number n of the "N" events registered within a time interval T is determined by the brightness of the transmitter, the transmission of the quantum channel, and the efficiency of the single photon detectors, and eventually a detector dark count rate. On the other hand, when LE is switched on (compare LE level graph 304 in FIG. 3B) in a probe interval of the same length T, the number of registered photon events increases significantly, and is higher than n (see graph 306 in FIG. 3B) as a result of the deliberate events introduced by LE, labelled "S". It is noted that the power of LE in this example embodiment is chosen to be at a ("low") level such that, when LE is switched on, the single photon detectors are in an intermediate operation mode in which single photon detection events and detection events caused by LE are detectable in the probe interval.

However, if the detectors are under a blinding attack and the eavesdropper creates fake state events (i.e. active manipulation), then, for an interval T when LE is turned off, the output from the detectors is similar to detection of single photons, with n fake state events (labelled "F" in graph 308 in FIG. 3A) instead of n "normal" single photon detection events. On the other hand, when LE is switched on at the low level, the optical power coupled to the single-photon detectors by LE (less than a few nW) will be much lower than the optical power injected by the eavesdropper to first blind the detectors and then create fake states in the detectors, and thus LE does not create detection events as the detectors are blinded most of the time. Therefore, switching on LE will not generate a noticeable difference on the output signal of the detectors (see graph 310 in FIG. 3B). Consequently, the number of detection events during the probe time interval T will generally not be larger than during the same time interval T with LE switched off (compare graph 308 in FIG. 3A and graph 310 in FIG. 3B).

It is noted that if the detectors are under a blinding attack without creation of fake state events (i.e. passive manipulation), the number of detection events during the probe time interval T with LE switched on will be less, typically zero, and hence will also not be larger than during the same time interval T with LE switched off.

An advantage of this example embodiment is that the detection mechanism does not significantly reduce the efficiency of "true" single photon detection, as the photodetector remains in a sensitive mode for true photons during the probe time interval T due to the low level for LE chosen accordingly, and just needs to process the additional deliberate events caused by LE. This rate just needs to be high enough to be detectable with a high statistical significance in a test interval, and can on average be of the same rate as the background event rate. Thus, the additional avalanche processes and the associated recovery time of the detectors do not need to increase significantly, and thus will not cause a significant reduction in detector efficiency.

Example Embodiment 2

In another example embodiment to detect a blinding attach, the light emitter LE is turned on for a short pulse time interval at a random timing and with a high enough energy (a few photons see graph 312 in FIG. 3C) to cause a detection event (labelled "FL" in graph 314 in FIG. 3C) with almost unit probability in an unblinded single-photon detector. A blinded detector (with or without fake state creation) is again insensitive to such a short optical pulse as long as the light level is below the fake state threshold (see graph 316 in FIG. 3C). In this situation, detecting a single flag event corresponding to the short pulse time interval in which LE is turned on can witness a non-blinded detector.

It is noted that in general, it requires the detector to absorb a few photons to create a photon detection event with high possibility according to a Poisson distribution. The power of the optical pulse generated by LE depends on the pulse duration, pulse wavelength, and detection efficiency at the emitted wavelength. For example, at 1000 nm wavelength and 100 ns pulse length, the average optical pulse power absorbed by the detector on the order of tens of pW should be sufficient to create a photon detection event with high probability. As another example, for 1000 nm wavelength and a 1ns pulse length, a pulse power on the order of nW should be sufficient to create a photon detection event with high probability. Accordingly, it will be appreciated that various suitable control settings can be implemented for a selected LE to create a photon detection event with high probability according to a Poisson distribution in such example embodiments.

Example Embodiment 3

The third self-testing example embodiment uses the light emitter in the receiver to locally blind the detector, i.e. at a high level (see graph 318 in FIG. 3D). The typical power necessary to blind an APD is on the order of a few nW, which can easily be accomplished by weakly coupling even faint light sources like LEDs. Detection events caused by single photons from the legitimate source will be suppressed by the local blinding light (see graph 320 in FIG. 3D). In absence of a negative detector manipulation (e.g. detector blinding), the intense light at the onset of the self-blinding period will almost deterministically create a flag event in the detector (labelled "FL" in graph 320), but then remains silent during the rest of the self-blinding interval. However, in the presence of detector blinding, no flag event will be created. On the other hand, any positive detector manipulation (i.e. to create fake states) will overrule the local blinding, and cause a fake detection event (see graph 322 in FIG. 3D). Both the initial flag event and any possible later fake event can be easily checked. This method only requires a small number of registered events in a time interval T to discover both a negative and positive detector manipulation attack.

A detector event could also be triggered when the detector recovers from a (remote) blinding exposure. Local blinding will suppress such "fake" detector events, so they may not get noticed by looking for signals under local blinding. However, in such a case, the flag event will also be suppressed. Therefore, a combination of checking for detection events during self-blinding and looking for a flag event can be used to identify such an attack.

It is noted that the choice of the sensing interval T in the first and third example embodiments does not need to be contiguous in time, and can be distributed over smaller intervals comparable to the average time between normal detection events. In this case, the presence of the sensing mechanism will advantageously not be visible to anyone listening in to the classical channel of a QKD protocol. For example, for embodiment 1 all that needs to be done is to compare detector event rates belonging to temporal subsets with the light emitter on and off, averaged over a period of time T do discern a statistically significant difference.

It is also noted that in quantum cryptography systems, such as QKD implementations, a bandpass filter (BP in FIG. 1) is usually present between the quantum channel and the receiver unit for background suppression, to prevent probing of various components through Trojan Horse attacks of the receiver, and/or to suppress signaling of the photodetector detection results through a breakdown flash. In a practical implementation according to an example embodiment of the present invention, the wavelength of the light emitter can be chosen to be very different from photons in the quantum channel. The bandpass filter can therefore also prevent light from the light emitter from leaking out to the quantum channel. Thus, the eavesdropper will advantageously not be able to retrieve timing information of the local blinding attack checking mechanism through the quantum channel, which would otherwise allow the eavesdropper to hide its activity by halting blinding attacks when the light emitter is on.

Preferably, the eavesdropper also does not gain useful timing information from the classical communication, for example by delaying the "sifting" communication between the two parties for a sufficiently long time after light emitter on/off switching is concluded, or by choosing on/off intervals for the light emitter that are sufficiently short compared to the mean time between average detection events.

It is noted that the described example embodiments to reveal a blinding attack will not only work for the most commonly used avalanche photodetectors, but also for superconducting nanowire detectors, or any threshold detector for single photons (i.e., devices that signal the arrival of one or more photons through the same signature) that is susceptible to a blinding attack, independent of its detection mechanism. This is a significant advantage compared to methods that require specific detector state monitoring.

Figure 4A:
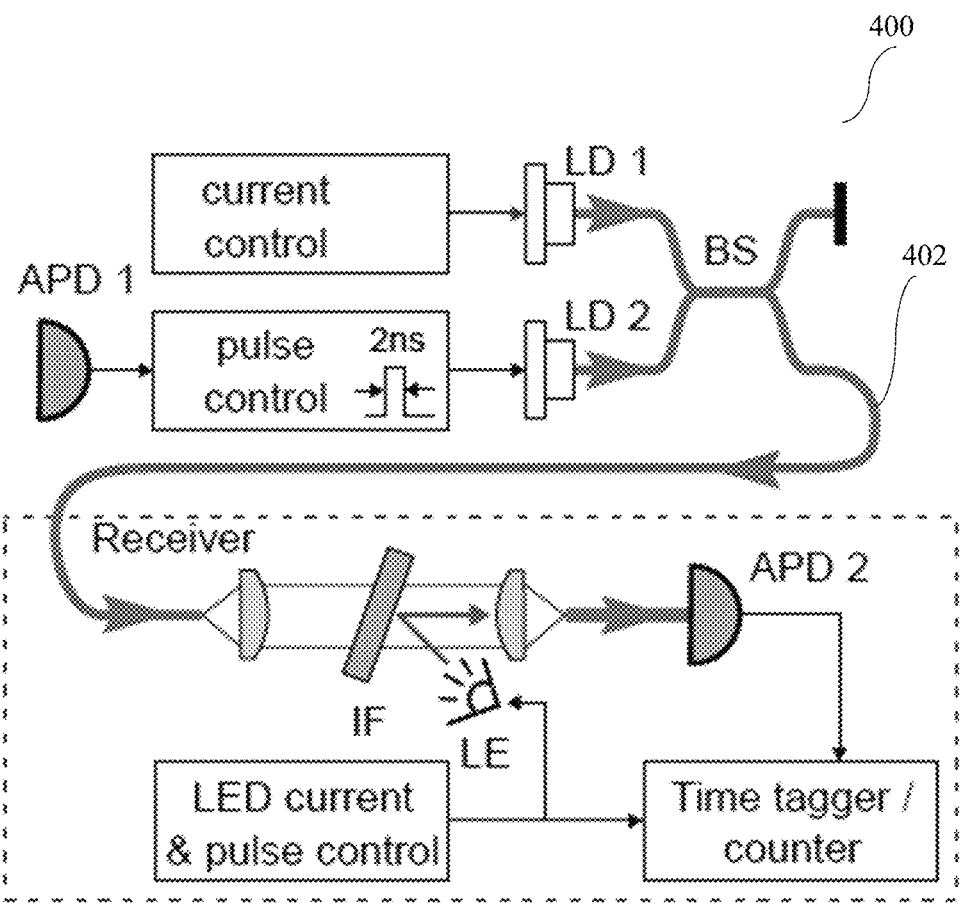
FIG. 4A is a schematic drawing illustrating a setup to demonstrate detector self-testing according to example embodiments.

The countermeasures according to example embodiments were demonstrated with a single-photon detector commonly used in quantum key distribution which is susceptible to manipulation attacks. With reference to the experimental set-up 400 shown in FIG. 4A, light that simulates legitimate quantum signals and provides the larger power levels required for detector manipulation is generated by combining the output of a continuous wave (cw) laser diode (LD1) with light from a pulsed laser diode (LD2) on a fiber beam splitter (BS). The 2 ns long bright fake states from LD2 can be emitted upon detection events from an auxiliary avalanche photodetector (APD1) to emulate a credible (Poissonian) event distribution. On the receiver side, the light from the quantum channel 402 passes through an interference filter (IF) before it is focused onto the main photodetector (APD2), a passively quenched InGaAs device (S-Fifteen Instruments IRSPD1) with a maximal count rate of $5 \times 10^5$ s$^{-1}$ and a dark count rate of $7 \times 10^3$ s$^{-1}$. The light emitter (LE) for detector selftesting is a light emitting diode with a center wavelength of 940 nm (Vishay VSLY5940), which is reflected off the IF (acting as a dichroic beam splitter) onto APD2, as a non-limiting example implementation of weak coupling.

Figure 4B:
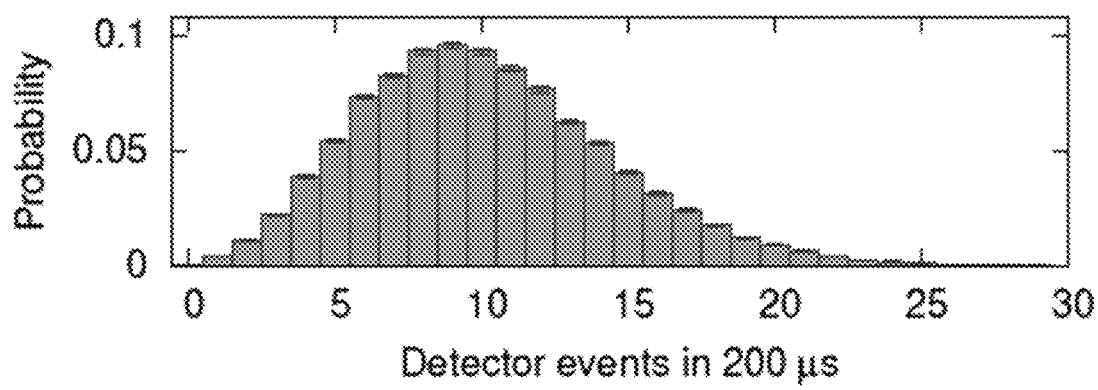
FIG. 4B shows a graph illustrating distribution of photodetection events in a time window of T=200 μs under "normal" operation under illumination of the detector with a low power level from the light emitter, according to an example embodiment.

For the demonstration, an event rate of $\sim 5 \times 10^4$ s$^{-1}$ at APD2 is considered, which is about an order of magnitude below the maximal detection rate to not reduce the detector efficiency significantly. FIG. 4B shows a histogram of detection events in a time interval of T=200 us generated by choosing an appropriate light level of LD1. The result with a mean photodetection number $\bar{n} \sim 10$ differs slightly from a Poisson distribution since the detector has an after-pulse possibility of about 40%. To implement a detector manipulation with the same event characteristic, the optical output power of LD1 is evaluated to 500 pW, the minimal power to completely blind detector APD2. Fake states that emulate photodetection events in APD2 are generated with optical pulses through LD2 with a peak power of 3 μW.

Figure 5:
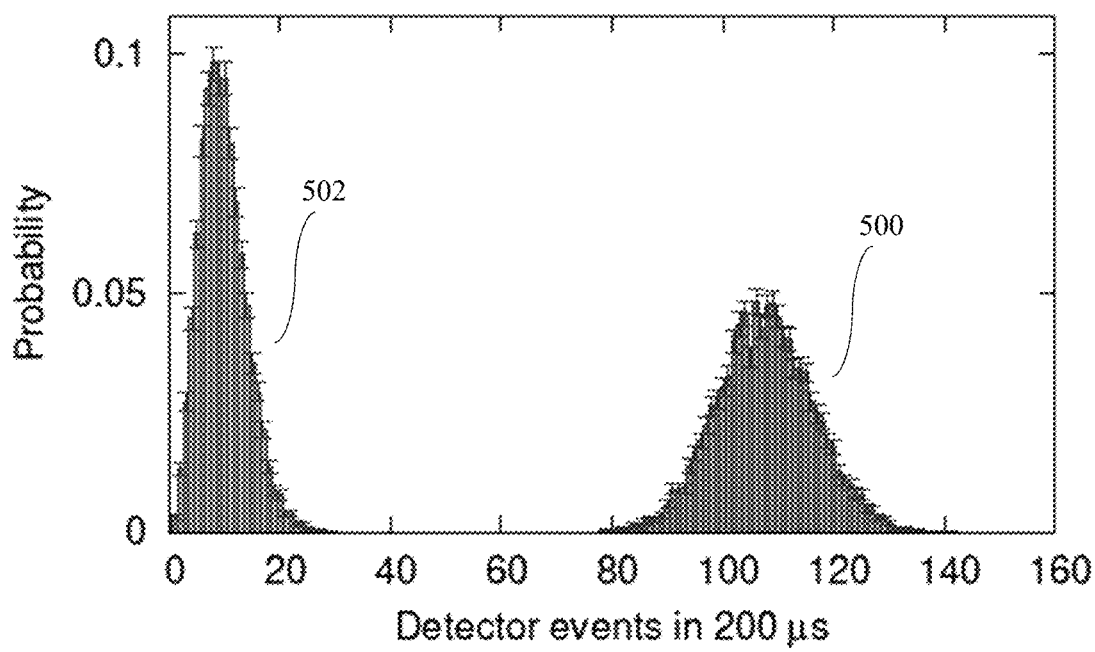
FIG. 5 shows a graph illustrating distributions of detector events under illumination of the detector with a low power level from the light emitter in a test interval of T=200 μs for a normally operating, and a manipulated detector, respectively, according to an example embodiment.

To demonstrate the first example embodiment of detector selftesting, the light emitter LE is turned on in the test interval T both for a normally operating and a manipulated detector. The resulting detection event distributions 500, 502 are shown in FIG. 5. For a normally operating detector, the observed APD2 events in the test interval increase significantly to a mean of about $\bar{n}_{T1} \sim 100$, while for a manipulated detector, the distribution is similar to the "normal" distribution with $\bar{n}_N \sim 10$ in FIG. 4B. With a threshold at n=50, the two distributions can be easily distinguished, and a detector manipulation attempt (specifically: the presence of a blinding light level) easily identified in a single measurement interval T; in the experiment, the unmanipulated detector never showed less than 78 events, while the manipulated showed never more than 30 events.

The necessary time to detect a manipulated detector can be shortened even further with the second example embodiment of self-testing. This is demonstrated by driving the light emitter LE to emit t=25 ns long pulses, and increasing the light intensity coupled to the detector APD2 compared to the demonstration of the first example embodiment. Since LE is weakly coupled to the detector APD2, increasing the light intensity coupled to the detector APD2 could be done by physically changing the alignment of LE to couple more light to the detector APD2. In another example, simply increasing the optical power of the LE can increase the light intensity coupled to the detector APD2, without changing the physical alignment. This example has the advantage of not requiring moving elements, and can be implemented e.g. by an increase in LED current.

Figure 6:
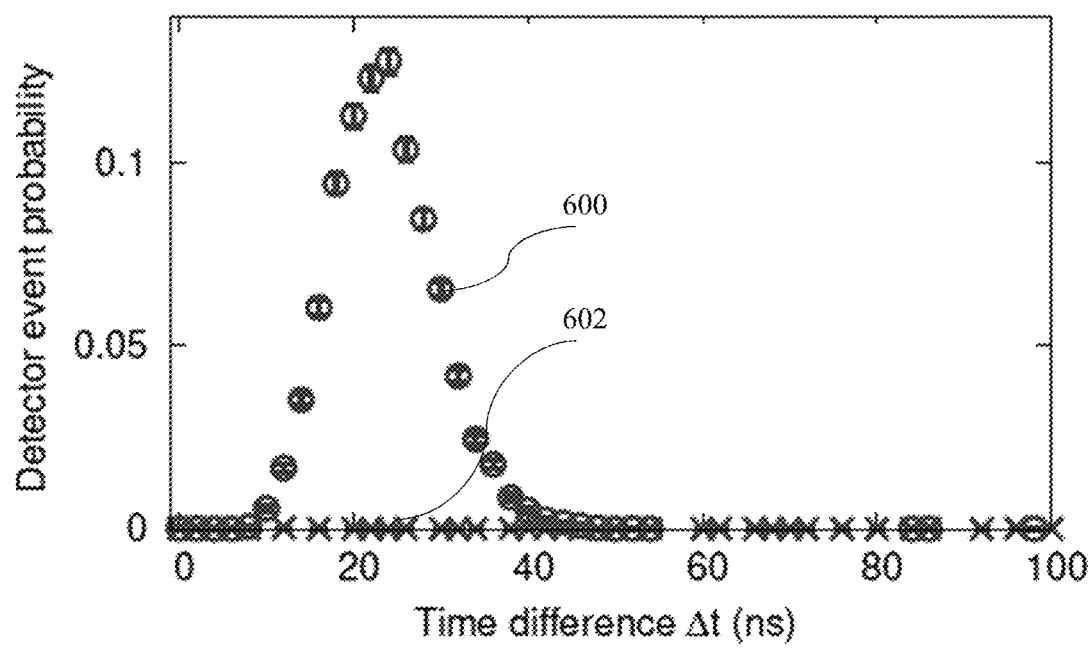
FIG. 6 shows a graph illustrating detector event probability for a 25 ns long bright pulse of the light emitter for a manipulated and normal detector, respectively, vs the time difference Δt between detector event and a self-testing pulse edge, according to an example embodiment.

FIG. 6 shows the probability of registering a signal from APD2 as a function of the time Δt after the start of the self-testing pulse. For an unmanipulated detector (curve 600), the overall probability of a detector response within 60 ns is $p_1$=93.4% (11720 photon detection events out of 12542 optical pulse). This number does not reach 100%, as the detector may have been in a recovery state from a previous detection event. For a manipulated detector (curve 602). i.e., in presence of both detector blinding and fake states, the integral probability of a detector event was about $p_2$=0.3% (36 out of 12380 test pulses). These events were caused by fake states, not by light from the LE. Detector manipulation (specifically, the detector blinding), with or without fake state creation, can therefore be identified with a few short test pulses to a very high statistical significance.

Figure 7:
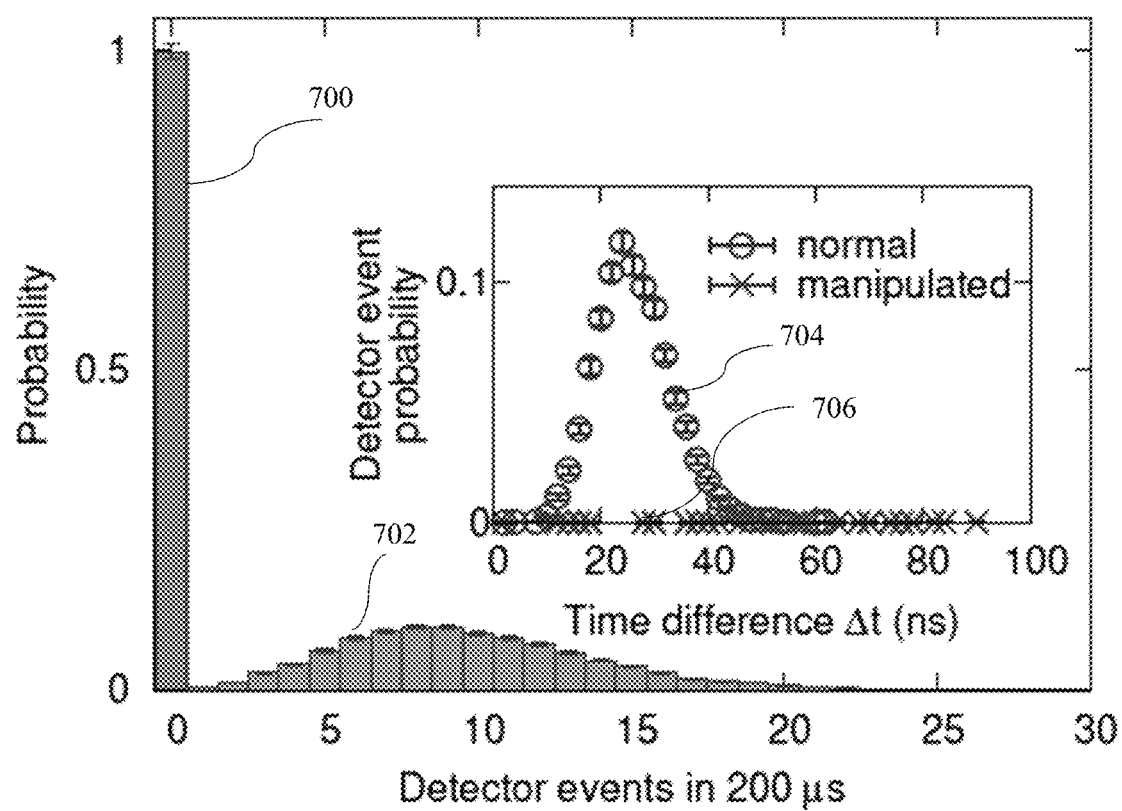
FIG. 7 shows a graph illustrating detector event distribution in a test interval T=200 us under illumination of the detector with a high power level from the light emitter for a normal and manipulated detector, respectively, registered 60 ns after the onset of the (self-blinding) light from the light emitter, according to an example embodiment. Inset: Graph illustrating probability of a detector event in the first 60 ns after switching on the (self-blinding) light from the light emitter, according to an example embodiment.

To demonstrate the third example embodiment of detector selftesting, the optical power of LE on detector APD2 is increased to a level that it could reliably blind the detector. FIG. 7 shows distributions of detection events in a test interval T=200 μs, taken 60 ns after the onset of light emission by LE. The unmanipulated detector (bar 700) is insensitive to single photons in this interval; only 8 events in 7608 test runs were observed (likely due to electrical noise), while a manipulated detector (curve 702) still reported events due to fake states present at the input; 7655 out of 7658 events were observed (with the remaining missing events compatible with a Poissoninan counting statistics). The onset of the LE emission triggered a flag event detector reaction (compare "FL" in graph 320 in FIG. 3D) within the first 60 ns with a probability $p_1$=97.6% (7426 detector events out of 7608 test runs, see inset of FIG. 7) for a non-manipulated detector (curve 704), while the probability of a flag event was $p_2$=0.2% (17 out of 7658 runs) for a manipulated detector caused by fake states (curve 706). According to the third example embodiment, a local light emitter that is able to self-blind the detector is thus able to reveal the presence of both a blinding attack (with or without fake state creation) and an attack where the detector recovers from a (remote) blinding exposure.

As described above, self-testing of single photon detectors that can reliably reveal manipulation attacks according to various example embodiments. The self-testing strategy uses a light source near the detector under possible external manipulation, and is able to detect both negative manipulations (i.e. suppression of single photon detections) and positive manipulations (i.e., generating detector events that are not caused by single photon detections) in a relatively short time with a high statistical significance. The detector self-testing according to example embodiments makes no assumptions on the nature of the manipulation attack of the detector, and thus also covers manipulations that are not of the known nature like detector blinding and fake states, as long as the attacks make the detector not sensitive to low-intensity light (single photons), i.e. attacks that silence the detector and/or causes fake events. No other knowledge of the detail of the attacking mechanism is required. For example, the embodiments described herein can detect manipulation of the detector with radiation outside the optical domain, say, with microwaves. X rays or some particle radiation that is not probed for or shield against. As the self-testing can be accomplished by a relatively simple light source (as long as this is outside the control and knowledge of an adversary), example embodiments can address one of the most significant hardware vulnerabilities of QKD systems in a significantly simpler way as compared to device-independent or measurement-device independent approaches, and may even be a suitable to retrofit existing QKD systems to make them resilient against detector manipulation attacks.

Figure 8:
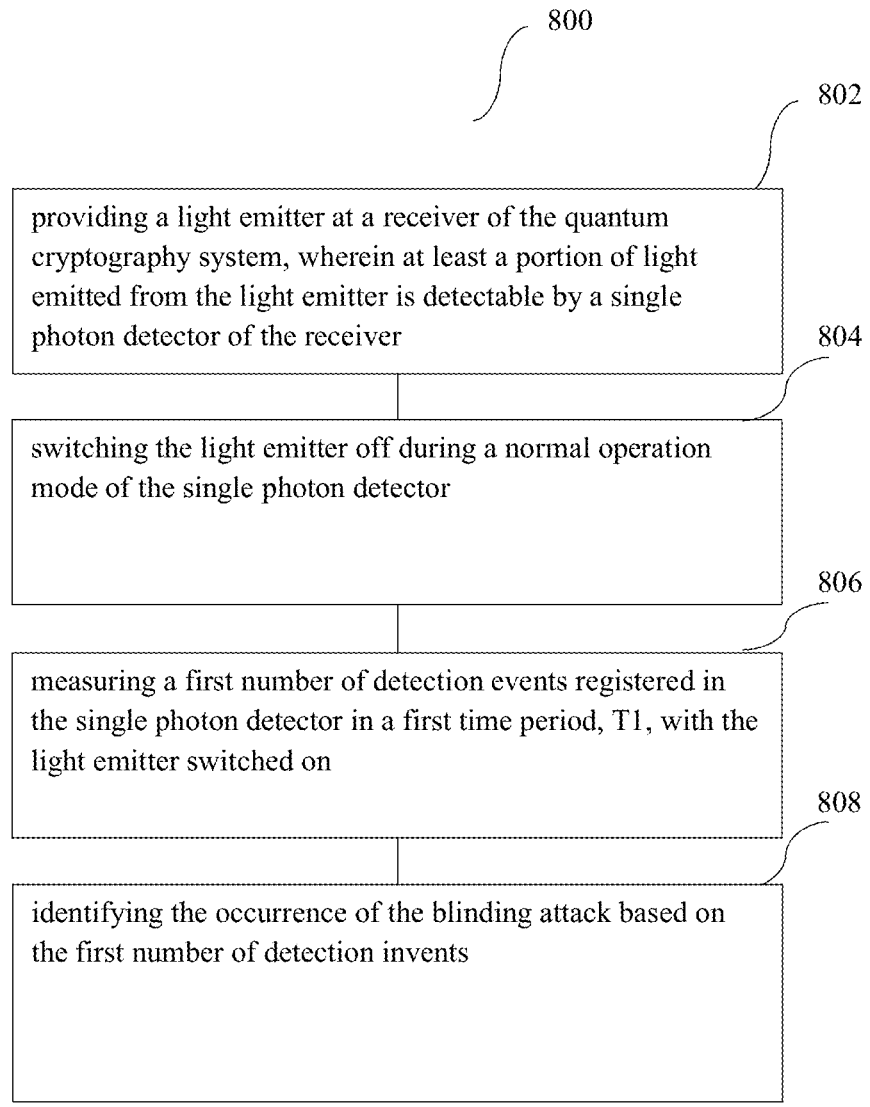
FIG. 8 shows a flowchart illustrating a method of identifying occurrence of a blinding attack in a quantum cryptography system is provided, according to an example embodiment.

FIG. 8 shows a flowchart 800 illustrating a method of identifying occurrence of a blinding attack in a quantum cryptography system is provided, according to an example embodiment. At step 802, a light emitter is provided at a receiver of the quantum cryptography system, wherein at least a portion of light emitted from the light emitter is detectable by a single photon detector of the receiver. At step 804, the light emitter is switched off during a normal operation mode of the single photon detector. At step 806, a first number of detection events registered in the single photon detector is measured in a first time period. T1, with the light emitter switched on. At step 808, the occurrence of the blinding attack is identified based on the first number of detection invents.

T1 may be randomly initiated.

T1 may be contiguous in time, or may be distributed over one or more time intervals.

The method may comprise setting a power of the light emitter to a first level such that, when the light emitter is switched on the single photon detector is in a first operation mode in which only a flag state detection event caused by the light emitter being turned on and fake state detection events as part of the blinding attack are detectable in T1. The occurrence of the blinding attack may be identified if at least one fake state detection event is registered in the single photon detector in T1. The occurrence of a blinding attack may be identified if no flag state detection event is registered in the single photon detector in T1.

The method may comprise setting a power of the light emitter to a second level such that, when the light emitter is switched on the single photon detector is in a second operation mode in which single photon detection events, detection events caused by the light emitter and fake detection events as part of the blinding attack are detectable in T1. Identifying the occurrence of the blinding attack may comprise measuring a second number of detection events registered in the single photon detector in a second time period. T2, with the light emitter switched off, and identifying the occurrence of the blinding attack based on a comparison of the first and second numbers of detection events. The occurrence of a blinding attack may be identified if the rate of detection events in T1 is not larger, by a statistically significant difference, than the rate of detection events in T2. T2 may be randomly initiated. T2 may be contiguous in time, or may be distributed over one or more time intervals. T1 and T2 may have the same length.

The method may comprise setting a power of the light emitter to a third level such that, when the light emitter is switched on for a single pulse time interval as T1, the single photon detector is in a third operation mode in which only a single detection event caused by the light emitter is detectable with approximately unit probability during the single pulse time interval. The occurrence of a blinding attack may be identified if no detection event caused by the light emitter is registered in the pulse time interval.

In one embodiment, a receiver for a quantum cryptography system is provided, the receiver comprising a single photon detector; a light emitter, wherein at least a portion of light emitted from the light emitter is detectable by the single photon detector; wherein the light emitter is configured to be off during a normal operation mode of the single photon detector; and a processor configured to measure a first number of detection events registered in the single photon detector in a first time period, T1, with the light emitter switched on and to identify the occurrence of the blinding attack based on the first number of detection invents.

T1 may be randomly initiated.

T1 may be contiguous in time, or may be distributed over one or more time intervals.

A power of the light emitter may be set to a first level such that, when the light emitter is switched on, the single photon detector is in a first operation mode in which only a flag state detection event caused by the light emitter being turned on and fake state detection events as part of the blinding attack are detectable in T1. The processor may be configured to identify the occurrence of the blinding attack if at least one fake state detection event is registered in the single photon detector in T1. The processor may be configured to identify the occurrence of the blinding attack if no flag state detection event is registered in the single photon detector in T1.

A power of the light emitter may be set to a second level such that, when the light emitter is switched on, the single photon detector is in a second operation mode in which single photon detection events, detection events caused by the light emitter and fake detection events as part of the blinding attack are detectable in T1. Identifying the occurrence of the blinding attack may comprise measuring a second number of detection events registered in the single photon detector in a second time period, T2, with the light emitter switched off, and the processor is configured to identify the occurrence of the blinding attack based on a comparison of the first and second numbers of detection events. The processor may be configured to identify the occurrence of the blinding attack if the rate of detection events in T1 is not larger, by a statistically significant difference, than the rate of detection events in T2. T2 may be randomly initiated. T2 may be contiguous in time, or may be distributed over one or more time intervals. T1 and T2 may have the same length.

The power of the light emitter may be set to a third level such that, when the light emitter is switched on for a single pulse time interval as T1, the single photon detector is in a third operation mode in which only a single detection event caused by the light emitter is detectable with approximately unit probability during the single pulse time interval. The processor may be configured to identify the occurrence of the blinding attack if no detection event caused by the light emitter is registered in the pulse time interval.

Embodiments of the present invention can have one or more of the following features and associated benefits/advantages.

| Feature | Benefit/Advantage |
| --- | --- |
| Use a light emitter (LE) under control of the legitimate receiver and not an eavesdropper to expose the single photon detector receiving single photon signals with additional light to check the detector status. Use a simple light emitter to check the detector status. | A light source not under the control of an eavesdropper can probe the detector's sensitivity to light levels at the single photon level by generating additional detection events that are suppressed in the presence of a blinding light field, or by deliberately blinding the detector with light levels that would only allow fake state pulses to induce detection-like events in the photodetectors. The two most commonly used single photon detectors in QKD systems are avalanche photodiodes (APD) and superconducting nanowire single-photon detectors (SNSPD). Both types of single photon detectors have wide wavelength sensitivity ranges that show significant sensitivity from the visible to the and near-infrared wavelengths even far outside their optimal performance range. Low-cost light emitters in these wavelength ranges with sufficiently high optical power are readily available off-the-shelf, for example LEDs (tens of cents to few dollars), or laser diodes (few dollars to tens of dollars). |
| Easy to integrate into existing QKD systems | Light emitters like LEDs or laser diodes are physically compact, adding very little additional hardware to existing single photodetection systems. The proposed scheme also does not require complex electronic circuitry around the single photon detectors, as it is required by other countermeasures. This reduces the complexity of integrating them, for example, into existing QKD systems, and may allow existing QKD systems to be retrofit. As the required coupling efficiencies of the additional light source to the detector can be very small, merely placing a light emitter close to single photon detectors could significantly increase the detector count rates, or even blind them. A careful optical alignment of the light emitter is typically unnecessary. The light emitter does not modify the quantum channel, nor does it require any public communication with the legitimate communication partner for the detection process. |
| Prevent information leaking by a bandpass filter | It is easy to choose the wavelength of the light emitter LE to be substantially different from the photons in the quantum channel. A bandpass filter between the receiver and the quantum channel (typically present already to prevent background light or information leakage out of the receiver) allows the quantum channel photons to enter the receiver while preventing the light from light emitter LE to leak out to the quantum channel. Thus, the eavesdropper has no timing information of the light emitter. |
| Low impact on key generation process | When adding additional optical events using the light emitter LE, they can be inserted roughly at a level of dark/background events of the photodetectors, and thus will rarely overlap with legitimate source photons. At this level, additional events do not significantly reduce the attention of the photodetectors to signal photons, and thus, the rate for key generation through this detector characterization method is not significantly reduced. A detector self-blinding could also be carried out at a sufficiently low fraction of the time so that the fraction of time detectors are active is not significantly reduced. |

The described embodiments of the present invention offer a robust countermeasure to a family of blinding attacks targeting threshold single photon detectors during quantum key distribution. The primary device used in the example embodiments is a low-cost and off-the-shelf light emitter, which generates a light field for testing the single photon detector. The generation of this test light can not be altered by the eavesdropper through the quantum channel. The light emitter only requires weak coupling to single-photon detectors, making the example embodiments easily applicable to any existing quantum key distribution system using single photon detectors. Specifically, the example embodiments do not require modification to the existing QKD system's quantum channel or the electronics of the single photon detectors, and may also be suitable for retrofitting existing systems.

Aspects of the blinding attack counter-measure systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g. a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A method of identifying occurrence of a blinding attack in a quantum cryptography system, the method comprising the steps of:
   providing a light emitter at a receiver of the quantum cryptography system, wherein the light emitter is different from a transmitter of a quantum cryptography signal to be received by the receiver, wherein the light emitter is different from a transmitter of a blinding attack signal directed at the receiver, and wherein at least a portion of light emitted from the light emitter is detectable by a single photon detector of the receiver;
   switching the light emitter off during a normal operation mode of the single photon detector;
   measuring a first number of detection events registered in the single photon detector in a first time period, T1, with the light emitter switched on; and
   identifying the occurrence of the blinding attack based on the first number of detection events.

2. The method of claim 1, wherein T1 is randomly initiated.

3. The method of claim 1, wherein T1 is contiguous in time, or distributed over one or more time intervals.

4. The method of claim 1, comprising setting a power of the light emitter to a first level such that, when the light emitter is switched on, the single photon detector is in a first operation mode in which only a flag state detection event caused by the light emitter being turned on and fake state detection events as part of the blinding attack are detectable in T1, and optionally wherein the occurrence of the blinding attack is identified if at least one fake state detection event is registered in the single photon detector in T1 and/or wherein the occurrence of the blinding attack is identified if no flag state detection event is registered in the single photon detector in T1.

5. The method of claim 1, comprising setting a power of the light emitter to a second level such that, when the light emitter is switched on, the single photon detector is in a second operation mode in which single photon detection events, detection events caused by the light emitter and fake detection events as part of the blinding attack are detectable in T1.

6. The method of claim 5, wherein identifying the occurrence of the blinding attack comprises measuring a second number of detection events registered in the single photon detector in a second time period, T2, with the light emitter switched off, and identifying the occurrence of the blinding attack based on a comparison of the first and second numbers of detection events.

7. The method of claim 6, wherein the occurrence of the blinding attack is identified if the rate of detection events in T1 is not larger, by a statistically significant difference, than the rate of detection events in T2.

8. The method of claim 5, wherein T2 is randomly initiated, and/or wherein T2 is contiguous in time, or distributed over one or more time intervals, and/or wherein T1 and T2 have the same length.

9. The method of claim 1, comprising setting a power of the light emitter to a third level such that, when the light emitter is switched on for a single pulse time interval as T1, the single photon detector is in a third operation mode in which only a single detection event caused by the light emitter is detectable with approximately unit probability during the single pulse time interval.

10. The method of claim 9, wherein the occurrence of the blinding attack is identified if no detection event caused by the light emitter is registered in the pulse time interval.

11. A receiver for a quantum cryptography system, the receiver comprising:
- a single photon detector;
- a light emitter, wherein the light emitter is different from a transmitter of a quantum cryptography signal to be received by the receiver, wherein the light emitter is different from a transmitter of a blinding attack signal directed at the receiver, and wherein at least a portion of light emitted from the light emitter is detectable by the single photon detector;
- wherein the light emitter is configured to be off during a normal operation mode of the single photon detector; and
- a processor configured to measure a first number of detection events registered in the single photon detector in a first time period, T1, with the light emitter switched on and to identify the occurrence of the blinding attack based on the first number of detection events.

12. The receiver of claim 11, wherein T1 is randomly initiated.

13. The receiver of claim 11, wherein T1 is contiguous in time, or distributed over one or more time intervals.

14. The receiver of claim 11, wherein a power of the light emitter is set to a first level such that, when the light emitter is switched on, the single photon detector is in a first operation mode in which only a flag state detection event caused by the light emitter being turned on and fake state detection events as part of the blinding attack are detectable in T1, and optionally wherein the processor is configured to identify the occurrence of the blinding attack if at least one fake state detection event is registered in the single photon detector in T1 and/or wherein the processor is configured to identify the occurrence of the blinding attack if no flag state detection event is registered in the single photon detector in T1.

15. The receiver of claim 11, wherein a power of the light emitter is set to a second level such that, when the light emitter is switched on, the single photon detector is in a second operation mode in which single photon detection events, detection events caused by the light emitter and fake detection events as part of the blinding attack are detectable in T1.

16. The receiver of claim 15, wherein identifying the occurrence of the blinding attack comprises measuring a second number of detection events registered in the single photon detector in a second time period, T2, with the light emitter switched off, and the processor is configured to identify the occurrence of the blinding attack based on a comparison of the first and second numbers of detection events.

17. The receiver of claim 16, wherein the processor is configured to identify the occurrence of the blinding attack if the rate of detection events in T1 is not larger, by a statistically significant difference, than the rate of detection events in T2.

18. The receiver of claim 15, wherein T2 is randomly initiated and/or wherein T2 is contiguous in time, or distributed over one or more time intervals and/or wherein T1 and T2 have the same length.

19. The receiver of claim 11, wherein a power of the light emitter is set to a third level such that, when the light emitter is switched on for a single pulse time interval as T1, the single photon detector is in a third operation mode in which only a single detection event caused by the light emitter is detectable with approximately unit probability during the single pulse time interval.

20. The method of claim 19, wherein the processor is configured to identify the occurrence of the blinding attack if no detection event caused by the light emitter is registered in the pulse time interval.

* * * * *